United States Patent [19] [11] 3,762,911
von der Crone et al. [45] Oct. 2, 1973

[54] METHOD OF REFINING SCRAP, ESPECIALLY OF COPPER-NICKEL ALLOY

[75] Inventors: Gerhard von der Crone; Horst Fricke, both of Altena, Germany

[73] Assignee: Vereinigte Deutsche Metallwerke AG, Frankfurt am Main, Germany

[22] Filed: May 14, 1971

[21] Appl. No.: 143,399

[30] Foreign Application Priority Data
May 19, 1970 Germany................... P 20 24 302.1

[52] U.S. Cl. .......................... 75/63, 75/44 S, 75/64, 75/85
[51] Int. Cl. ...... C22b 7/00, C21c 1/04, C22b 25/06
[58] Field of Search ....................... 75/63, 64, 44 S, 75/85, 86–88

[56] References Cited
UNITED STATES PATENTS

| | | | |
|---|---|---|---|
| 3,480,420 | 11/1969 | Loukes | 75/85 |
| 2,815,267 | 12/1957 | Platteeuw | 75/85 |
| 2,456,935 | 12/1948 | Fisher | 75/63 |
| 3,484,233 | 12/1969 | Bonilla | 75/63 |
| 2,899,295 | 8/1959 | Kattner | 75/85 |
| 2,474,979 | 7/1949 | Jordan | 75/85 |
| 2,206,117 | 7/1940 | Osborn | 75/85 |
| 1,202,886 | 10/1916 | Phelps | 75/64 |
| 1,669,485 | 5/1928 | Nordling | 75/44 S |
| 1,515,616 | 11/1924 | Poppenhusen | 75/44 S |
| 3,615,357 | 10/1971 | Wainer | 75/64 |
| 1,846,738 | 2/1932 | Kohlmeyer | 75/87 |

Primary Examiner—Dewayne Rutledge
Assistant Examiner—Peter D. Rosenberg
Attorney—Karl F. Ross

[57] ABSTRACT

A method of refining scrap of a high-melting-point metal alloy, especially a copper-nickel alloy, in which the scrap is heated in vacuo to a temperature lower than the smelting point of the scrap, at which impurities, e.g. lead, tin and zinc, or compounds of these elements, especially their oxides, on the surface of the scrap have a vapor pressure sufficient to cause vaporization of the impurities. The thus purified metal may be smelted for further refining or alloying, or casting into ingots without further treatment.

8 Claims, 2 Drawing Figures

PATENTED OCT 2 1973    3,762,911

Gerhard von der Crone
Horst Fricke
INVENTORS.

BY

Karl F. Ross
Attorney

METHOD OF REFINING SCRAP, ESPECIALLY OF COPPER-NICKEL ALLOY

FIELD OF THE INVENTION

Our present invention relates to a method of removing impurities from metal in the form of scrap in which the impurity metal is present in relatively high concentration on the surfaces of the main metal; more particularly, the invention relates to a method of refining a high-melting-point metal scrap, e.g. of copper-nickel alloy, having an adherent impurity in the form of at least one low-melting-point metal such as lead, tin or zinc, especially in the form of a solder.

BACKGROUND OF THE INVENTION

Various approaches have been used heretofore to purify metals with adherent impurities, e.g. solder, containing low-melting-point metals such as lead, tin, zinc and even arsenic. It should be understood that, when a high-melting-point metal, e.g. a copper-nickle alloy, is smelted from the scrap state, such adherent impurity metals eventually are found in the melt and the ingots cast therefrom and may vary the physical and other characteristics of the ingot. Consequently, refining or purification procedures have been proposed. In one such procedure, the scrap is heated to the point that the adherent solder melts and drips from the high-melting-point metal. Generally, the scrap is vibrated to promote the mechanical release of the liquid impurity. This system is, however, not always successful because some of the impurity metal, generally solder, tends to collect in pockets formed in the mass of scrap, especially when the latter is a compacted body of such scrap. Tin has been removed from tin plate and other scrap materials by treating the latter with chlorine gas to drive off the tin as the volatile $SnCl_4$. This procedure is unsafe because of the toxicity of the chlorine gas and requires special vessels, pipes and the like because of the corrosivity of the gas. Finally, we may mention vacuum-refining processes in which the smelting scrap is subjected to a vacuum for eventual removal of the impurity solubilized therein. Such refining is time-consuming and expensive. Furthermore, it is only successful in removing zinc, in some cases for lead, but fails in removing tin.

OBJECTS OF THE INVENTION

It is the general object of the present invention to provide an improved method of refining metal scrap containing adherent impurity metals, which have as metals or oxides a high vapor pressure, especially lead, tin, arsenic or zinc in the elemental state, as alloys or solid solutions, and in any combination, wherein the aforementioned disadvantages are obviated.

Another object of this invention is to provide a low-cost method of refining copper-nickel alloy scrap to which such impurities are adherent in the form of solder.

Yet a further object of the invention is the provision of a method of refining, purifying or simply treating a high-melting-point metal to which lead, tin and/or zinc are adherent, the process being relatively rapid, free from danger of corrosive attack on the equipment or plant and of toxic effect upon personnel, and of relatively low cost.

SUMMARY OF THE INVENTION

These objects and others which will become apparent hereinafter, are attained, in accordance with the present invention, in a method of refining a metal scrap coated at least in part with at least one adherent impurity metal selected from the group which consists of lead, tin and zinc (also including arsenic) which method includes the step of heating the scrap under vacuum to a temperature sufficient to vaporize the impurity but less than that at which the melting point of the main metal is attained, the impurity metals being volatilized. Thus, if the melting point of the main metal is represented as $T_{HM}$ and the temperature at which the vapor pressure of the impurity metals or their oxides is as high as the vacuum in the processing vessel represented as $T_I$, the refining temperature T can be defined as $T_{HM} > T$   $T_I$, it being understood that these temperatures are intended to be characteristic of the respective metals at the reduced pressure to which the scrap is subjected.

In other words, we have found, most surprisingly, that all of the disadvantages mentioned earlier can be overcome by heating the scrap according to the invention under a vacuum to such an extent that only the adherent impurity metals are evaporated, without smelting the rest of the scrap. According to an important feature of the invention, the heating is carried out in the presence of an oxidizing atmosphere so that the adhering material is oxidized and volatilization of impurities such as lead, tin and arsenic, is facilitated.

While we do not wish to be bound by any theory in this respect, we believe that the surprising results mentioned earlier can be explained as follows: solder contains 20 percent to 70 percent by weight lead, the balance tin and possibly other low-melting-point metals. When scrap contaminated by adhering solder is melted, the concentration of the impurity metals in the melt is generally less than about 1 percent. The vapor pressure of metals to be removed by vacuum treatment depends much more on the concentration of the metal than on other parameters such as temperature. For instance, the vapor pressure of pure lead (100 percent) at 1450°C is about 120 torr (mmHg). When the concentration of the lead falls to, say, 0.12 percent, the vapor pressure is about $4 \times 10^{-2}$ torr at the same temperature. The corresponding values for 1600°C are about 410 and $1.5 \times 10^{-1}$ torr respectively. Hence removal of the impurity from a melt in which the impurity metal is strongly diluted, is extremely difficult, if not impossible, whereas the concentration of the impurity along the surface is approximately 100 percent in terms of the total impurity and may be, say, 50 percent for lead in a 50 to 50 lead-tin solder.

According to another feature of the invention, oxygen is supplied to the treatment vessel in the form of air, oxygen-enriched air or pure oxygen. The oxygen source may also be oxides of the base metal which may decompose to release oxygen, or which simply may combine with the elemental impurity metals. The presence of oxygen facilitates volatilization of the impurity metals because the oxides thereof may have lower boiling points than the metals themselves so that the impurity may be removed even faster in the form of their oxides.

In general, the impurities oxidize much more completely when solid scrap is treated than during vacuum refining where the base metal is in a molten state. Oxidation, carried out under pressure and temperature conditions in which only the solder is liquid, has the further advantage that the base metal is not significantly oxidized so that oxidation losses are almost totally precluded.

While the principles of the present invention are applicable to a wide variety of high-melting-point metals, we have found that the method operates best with copper-nickel alloys in which lead, tin and zinc are the impurities in a surface-adherent form, preferably as alloys, eutectics or solid solutions applied in the form of solder. Of course, the temperature and pressure conditions are mutually dependent and will determine the treatment time. However, we have found that treatments between 800°C and 1600°C, preferably between 950°C and 1250°C, offer the best results at reduced pressures at a level below 1 torr and above $10^{-4}$ torr; preferably the reduced pressure lies between $10^{-1}$ torr and $10^{-3}$ torr. Under the latter conditions, the treatment can be accomplished in less than an hour and the preferred treatment time ranges between 0.1 to 0.5 hours.

According to yet another feature of the invention, the scrap, treated as prescribed above, is smelted directly, i.e. without an intervening cooling, and the melt cast into ingots after any necessary further treatment such as alloying.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
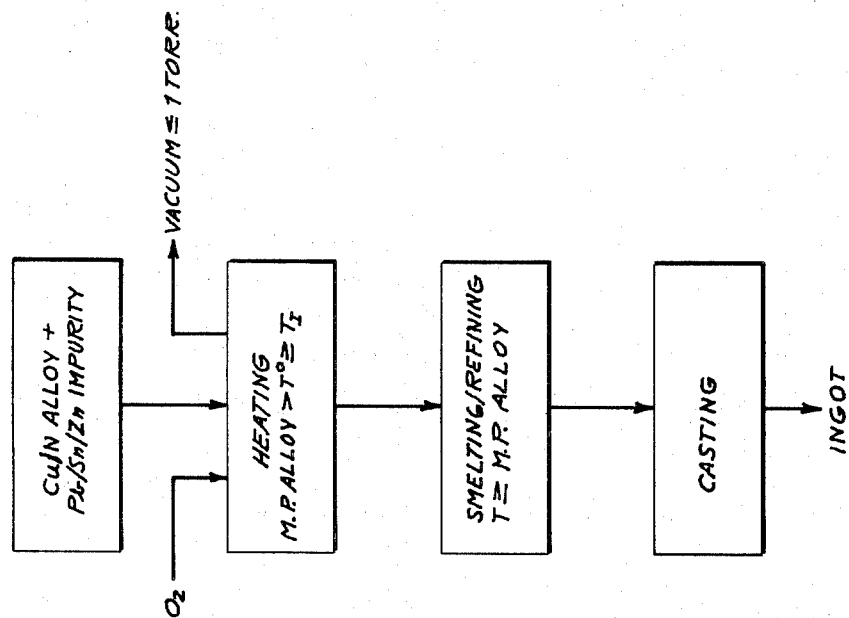
FIG. 1 is a block diagram illustrating successive stages of the present invention.

In FIG. 1, the copper-nickel alloy scrap to which a lead-tin solder or any other lead/tin/zinc (and possible arsenic) impurity is adherent, is introduced into a vessel for heating to a temperature T which is less than the melting point of the alloy but greater than or equal to the temperature at which the vapor pressure of the impurity component is as high as the vacuum. Oxygen may be fed to the vessel as illustrated to provide the oxidizing atmosphere. In the next stage, without intermediate cooling, the scrap is smelted at a temperature greater than or equal to the melting point of the alloy or base metal, whereupon the melt can be cast into an ingot.

Figure 2:
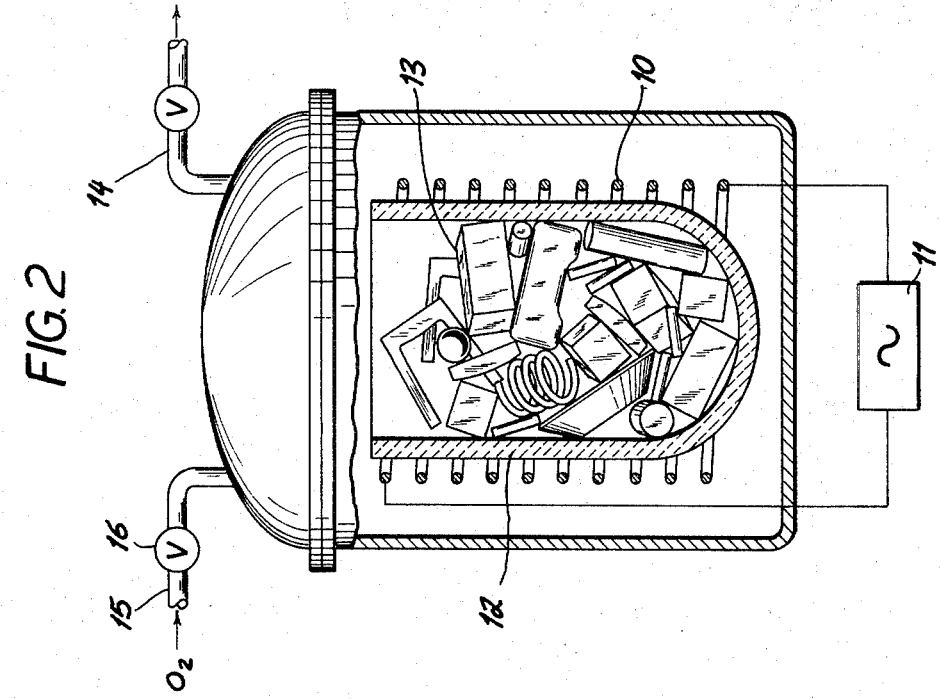
FIG. 2 is a diagrammatic cross-sectional view through an apparatus for carrying out the method of the present invention.

In FIG. 2, we have shown a system for carrying out the present invention and intended to represent a vacuum induction furnace wherein the induction coil 10 is energized by the alternating current source 11 and surrounds a crucible 12 of a ceramic composition. The scrap 13, to which the impurity metal is adherent, can thus be heated to the indicated temperature. Suction is applied by a pump through fitting 14 and oxygen may be added at a fitting 15. When removal of the impurity metal is complete, valve 16 may be closed to terminate the oxygen supply and valve 17 may cut off the vacuum while the induction heating effect is increased to melt the scrap. Of course, suction may be maintained during the smelting step to effect further purification.

SPECIFIC EXAMPLES

Example I

Sheet and tubular scrap of copper-nickel alloys containing 15 to 25 percent by weight nickel, the balance copper and the usual impurities, contaminated by surface-adherent solder (50—50 lead-tin solder) is heated in a ceramic-interlined basket in an evacuatable furnace chamber to a temperature of 1000° to 1200°C. The chamber is then evacuated to $10^{-1}$ torr. With a charge of 5000 kg, the treatment time including heating up was about 2 hours, although the period at which the scrap was maintained at the indicated elevated temperature and reduced pressure was only about one-half hour. The scrap removed from the furnace chamber contained only 0.06 percent lead and tin upon smelting. A similar scrap subjected only to vacuum purification in the melt, contained a minimum of 1.0 percent lead and tin when the treatment was discontinued because no further reduction in concentration of the impurities occurred.

Example II

A slightly oxidized mixed scrap consisting of different copper-nickel alloys and contaminated with solder as described in Example I was heated in a vacuum induction furnace to a temperature of 1000°C. The charge was about 500 kg. The pressure was reduced to $10^{-2}$ to $10^{-3}$ torr and, after 0.20 hour, the impurity-metal removal was such that the scrap could be smelted, cast into ingots and used without concern for the lead, tin, zinc or arsenic concentrations. A similar scrap was treated for a period of 3.5 hours by vacuum refining in the melt to yield a composition whose lead content allowed the melt to be further processed.

Example III

In place of the slightly oxidized scrap of Example II, an unoxidized scrap was used except that air was continuously passed into the furnace. Approximately identical results were obtained.

Example IV

The procedure of Example II was followed with the materials therein specified, except that a nonoxidized scrap was employed and air enriched with oxygen to an oxygen content of 50 percent by volume was continuously introduced into the chamber. Again, similar results were obtained. The technique was found to apply to copper-nickel alloys with copper and nickel contents ranging between 5 and 50 percent by weight, with lead-tin solders containing 20 to 70 percent by weight lead, the balance tin, such solders containing zinc in amounts up to 50 percent and impurity compositions containing concentrations of arsenic between 0.5 and 25 percent by weight.

We claim:

1. A method of refining a scrap of a high--melting-point metal, coated at least in part with at least one impurity metal selected from the group which consists of lead, tin, zinc, arsenic, alloys thereof, mixtures thereof and eutectics thereof , comprising the steps of heating said scap under vacuum to a temperature of about 800°C to 1600°C at a pressure of at most 1 torr and to volatilize said impurity metal sufficient to volatilize said impurity metal selected from the group which consists of lead, tin, zinc, arsenic, alloys thereof, mixtures thereof and eutectics thereof but less than that at which said high-melting-point metal is melted.

2. The method defined in claim 1 wherein said high-melting-point metal is a copper-nickel alloy.

3. The method defined in claim 2 wherein said impurity metal is a lead-tin solder adherent to said copper-nickel alloy.

4. The method defined in claim 3, further comprising the step of oxidizing said impurity metal during the heating thereof.

5. The method defined in claim 4 wherein said scrap is heated in an oxygen-containing atmosphere produced by feeding air, oxygen-enriched air or oxygen into the region in which said scrap is heated.

6. The method defined in claim 4 wherein said impurity metal is oxidized at least in part by oxygen derived from oxidized copper-nickel alloy.

7. The method defined in claim 4, further comprising the step of smelting said scrap upon volatilization of the impurity metal without intervening cooling.

8. The method defined in claim 7 wherein said pressure ranges between $10^{-1}$ and $10^{-4}$ torr and the temperature ranges between 950°C and 1250°C during volatilization of said impurity metal, said scrap being heated to volatilize said impurity metal over a period up to about 1 hour.

* * * * *